(12) United States Patent
Yu et al.

(10) Patent No.: US 9,179,089 B2
(45) Date of Patent: Nov. 3, 2015

(54) ELECTRONIC DEVICE HAVING BUTTON SECURING STRUCTURE

(71) Applicant: ShenZhen Goldsun Network Intelligence Technology Co., Ltd., Shenzhen (CN)

(72) Inventors: Yong-Jun Yu, Shenzhen (CN); Xue-Feng Wan, Shenzhen (CN)

(73) Assignee: ShenZhen Goldsun Network Intelligence Technology Co., Ltd., ShenZhen (CN)

(*) Notice: Subject to any disclaimer, the term of this patent is extended or adjusted under 35 U.S.C. 154(b) by 399 days.

(21) Appl. No.: 13/797,813

(22) Filed: Mar. 12, 2013

(65) Prior Publication Data

US 2013/0266294 A1    Oct. 10, 2013

(30) Foreign Application Priority Data

Apr. 10, 2012    (CN) .......................... 2012 1 0102663

(51) Int. Cl.
*H04N 5/77* (2006.01)
*H04N 5/64* (2006.01)
*G11B 33/02* (2006.01)
*H01H 13/14* (2006.01)

(52) U.S. Cl.
CPC ................ *H04N 5/64* (2013.01); *G11B 33/027* (2013.01); *H01H 13/14* (2013.01)

(58) Field of Classification Search
USPC .......................... 386/362, 358, 359, 361, 360
See application file for complete search history.

(56) References Cited

U.S. PATENT DOCUMENTS

| 8,447,174 B2 * | 5/2013 | Schedivy ...................... 386/358 |
| 8,842,966 B2 * | 9/2014 | Pizzuto et al. ................ 386/231 |
| 8,842,979 B2 * | 9/2014 | Jung ............................ 386/361 |

* cited by examiner

*Primary Examiner* — Robert Chevalier
(74) *Attorney, Agent, or Firm* — Novak Druce Connolly Bove + Quigg LLP

(57) ABSTRACT

An electronic device includes a body, a disc cover, a button, at least one guiding post, at least one first hook and a number of resisting elements, and a button securing structure. The button securing structure defines a button groove for receiving the button and includes at least one sleeve, a sliding bar, and an elastic element. The button groove includes a sidewall detachably clasped by the first hooks. The sleeve defines a pivot hole defining at least one groove containing lubricant on its inner wall. The sliding bar is slidably coupled to the body and detachably clasps the disc cover. One end of the sliding bar resists against the resisting elements. The elastic member includes one end clasped by a clasping member protruding from the sliding bar, and an opposite end being clasped by a second hook protruding from the body.

10 Claims, 7 Drawing Sheets

ELECTRONIC DEVICE HAVING BUTTON SECURING STRUCTURE

BACKGROUND

1. Technical Field

The present disclosure relates to an electronic device having a button securing structure.

2. Description of Related Art

Many electronic devices, digital video disc (DVD) players, for example, are equipped with various buttons such as power buttons and disc cover buttons. The button includes a pressing portion, a guiding post protruding from the bottom surface of the pressing portion, a guiding groove for receiving and guiding the guiding post, and a resisting portion for resisting the pressing portion. When the pressing portion is depressed, the guiding post slides along the guiding groove. The pressing portion triggers a switch or pushes an element of the electronic device when depressed, to activate/close a function or the element of the electronic device. However, the lubrication provided in the gap between the guiding post and the guiding groove becomes weak after the repeated use of the button. And the friction between the guiding post and the guiding groove may give off metal particles, which may cause the button to jam and stop working.

Therefore, what is needed is an electronic device having a button securing structure to overcome the limitations described above.

BRIEF DESCRIPTION OF THE DRAWINGS

The components in the drawings are not necessarily drawn to scale, the emphasis instead being placed upon clearly illustrating the principles of this disclosure. Moreover, in the drawings, like reference numerals designate corresponding parts throughout the several views.

DETAILED DESCRIPTION

Figure 1:
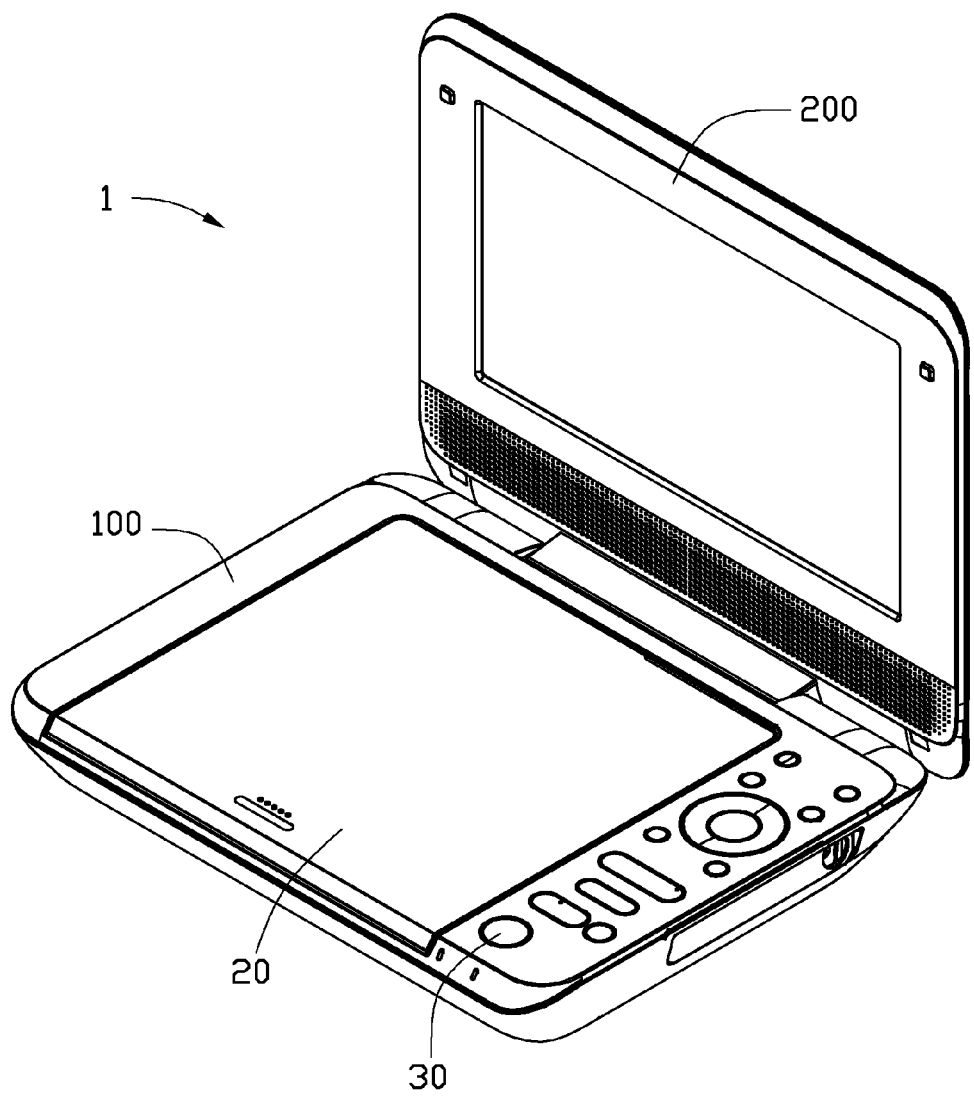
FIG. 1 is an isometric view of an exemplary embodiment of an electronic device.
Figure 2:
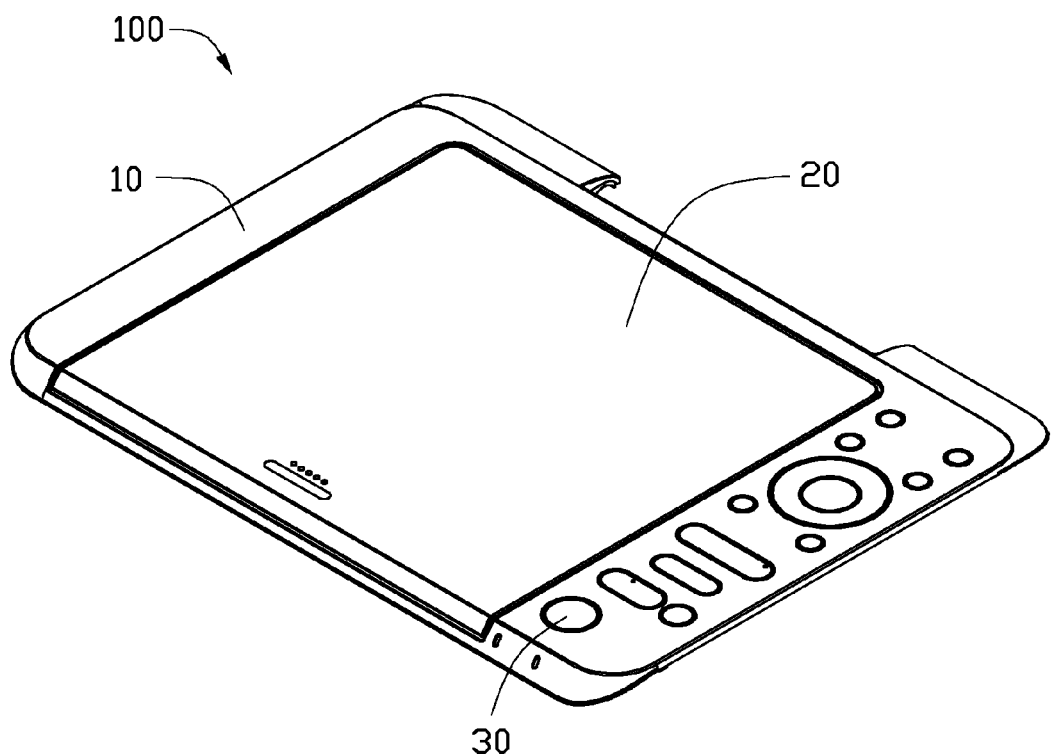
FIG. 2 is an isometric view of a base of the electronic device of FIG. 1.
Figure 3:
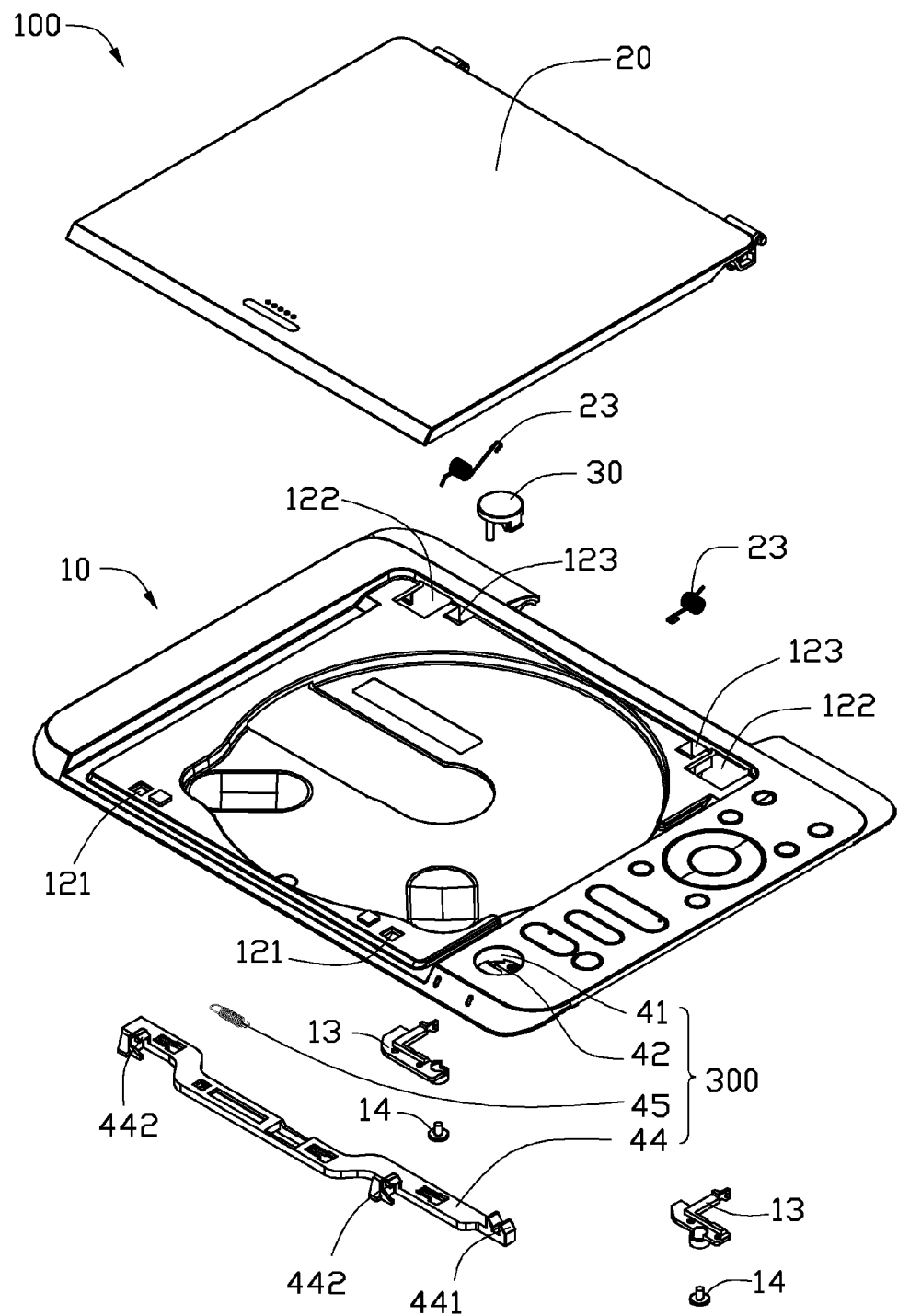
FIG. 3 is an exploded view of base of FIG. 2, the bottom cover taken off the base.

Referring to FIGS. 1-3, an exemplary electronic device 1 includes a base 100, a display 200 rotatably connected to the base 100, and a button securing structure 300. The base 100 includes a body 10, a round plate (disc cover 20) rotatably connected to the body 10, a button 30 secured in the body 10, and a bottom cover (not shown). The button 30 is used for opening the disc cover 20. In the embodiment, the button securing structure 300 effectively prevents the button 30 from being jammed during use. The electronic device 1 is a DVD player. In other embodiments, the electronic device 1 can be a mobile phone, a tablet computer, a music player, or other electronic devices having buttons.

Figure 4:
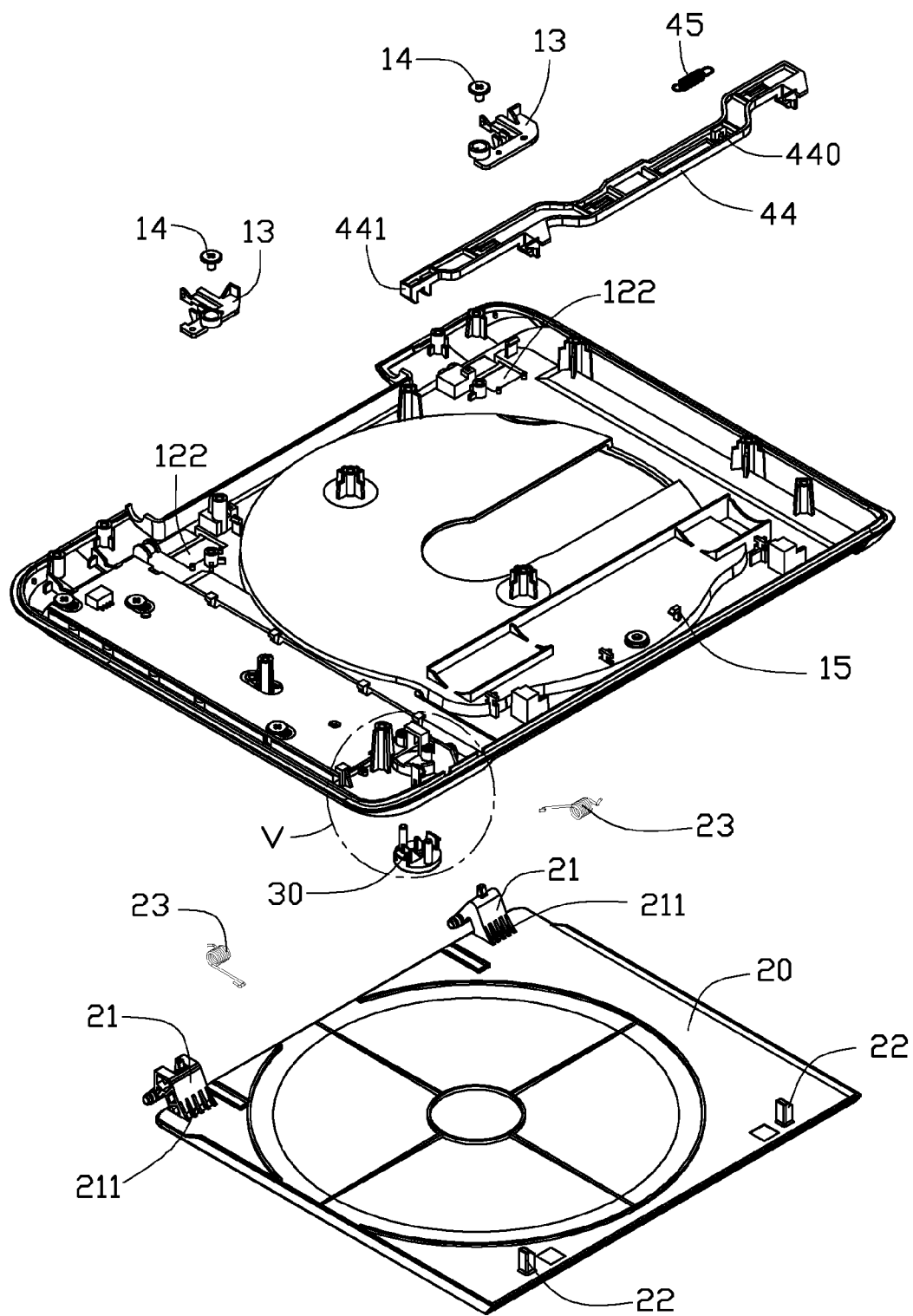
FIG. 4 is similar to FIG. 3, but viewed from another perspective.

Referring to FIG. 4, two pivot seats 21 and two stopping elements 22 protrude from the inner surface of the disc cover 20. Each pivot seat 21 includes a shaft that is rotatably received in a coupling element (not labeled) on the inner surface of the body 10, thereby rotatably connecting the disc cover 20 to the body 10. In the embodiment, there are two torsion springs 23 mounted between the cover 20 and the body 10, and the two springs 23 apply a rebounding force to the cover 20, to urge it open. The pivot seat 21 includes a number of ribs 211 close to the disc cover 20 and parallel to each other.

Referring to FIGS. 3 and 4, the base 10 defines a chamber 12 for receiving the disc cover 20. The bottom surface of the chamber 12 defines two first through holes 121 which the stopping elements 22 pass through, two second through holes 122 penetrated by the pivot seats 21, and two receiving openings 123 for receiving the springs 23. The base 10 also includes two fixing element 13 fixed to its inner surface. One end of the spring 23 resists against the inner surface of the base 10, and the other end of the spring 23 is fixed to the fixing element 13.

The pivot seats 21 penetrate the second through holes 122, and are received in the body 10. Each fixing element 13 resists against a rib 211. One end of the spring 23 resists against the base 10, and the other end of the spring 23 is fixed to the fixing element 13. Then the fixing elements 13 are fixed to the base 10 via screws 14.

Figure 5:
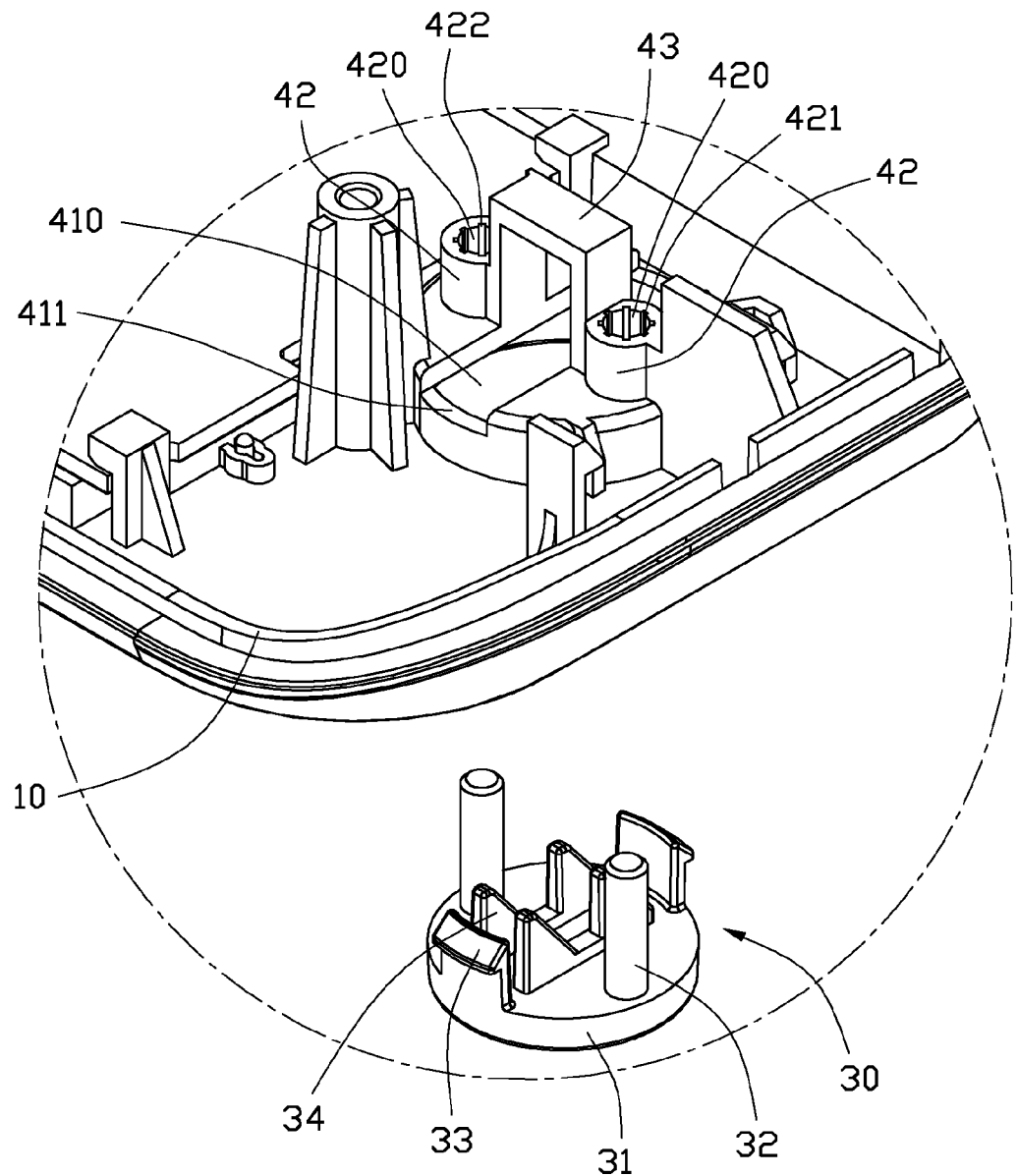
FIG. 5 is a partial, enlarged view of the circled portion V of the base of FIG. 4.

Referring to FIG. 5, the button 30 includes a circular press portion 31, two guiding posts 32, two first hooks 33, and a number of wedge-shaped resisting elements 34. The guiding posts 32, the first hooks 33, and the resisting elements 34 protrude from the bottom surface of the press portion 31. In the embodiment, the press portion 31 is a flat-ended cylinder and is disc-shaped. The guiding posts 32 are cylindrical and symmetrically protrude from the bottom surface of the button 30. The number of the resisting elements 34 is four. In an alternative embodiment, the number of the guiding posts 32, the first hooks 33, and the resisting elements 34 can be varied according to need.

Referring to FIGS. 3-5, the button securing structure 300 defines a button groove 41 and includes two sleeves 42 and a U-shaped support 43. The button groove 41 is defined in the body 10 for receiving the button 30. The button groove 41 defines an opening 410 in the bottom and includes a sidewall 411 for being clasped by the first hooks 33 of the button 30. The sleeves 42 and the support 43 protrude from the bottom surface of the button groove 41. The center of the sleeve 42 defines a pivot hole 420 for being penetrated through by the guiding post 32. The inner wall of the pivot hole 420 defines a number of oil grooves 421 for containing lubricant. Each of the oil grooves 421 is long and strip shaped and each groove 421 extends along the axial direction of the pivot hole 420. The lubricating oil contained in the oil grooves 421 reduces friction between the inner walls of the pivot holes 420 and the guiding posts 32. In the embodiment, the button groove 41 is circular. The number of the sleeves 42 is the same as the number of the guiding posts 32. In an alternative embodiment, the number of the sleeves 42 and the guiding posts 32 can be varied according to need.

Referring to FIGS. 2 and 3, the button securing structure 300 further includes a sliding bar 44 and an elastic member 45 for slidably connecting the sliding bar 44 to the body 10. In the embodiment, the elastic member 45 is a coil spring. A clasping member 440 protrudes from the sliding bar 44 for clasping one end of the elastic member 45. One distal end of the sliding bar 44 penetrates through the hollow of the support 43 and is supported by the support 43 (see FIGS. 5 and 6). The sliding bar 44 further includes a resisting member 441 on the distal end supported by the support 43, for resisting the resisting elements 34. The resisting member 441 is also wedge-shaped for contacting the resisting elements 34. A second hook 15 protrudes from the inner surface of the body 10 for clasping the other end of the elastic member 45. Two third hooks 442 protrude from the sliding bar 44 for penetrating through the first through hole 121 of the body 10 to clasp the stopping element 22 of the disc cover 20, thus locking the disc cover 20 on the body 10.

Figure 6:
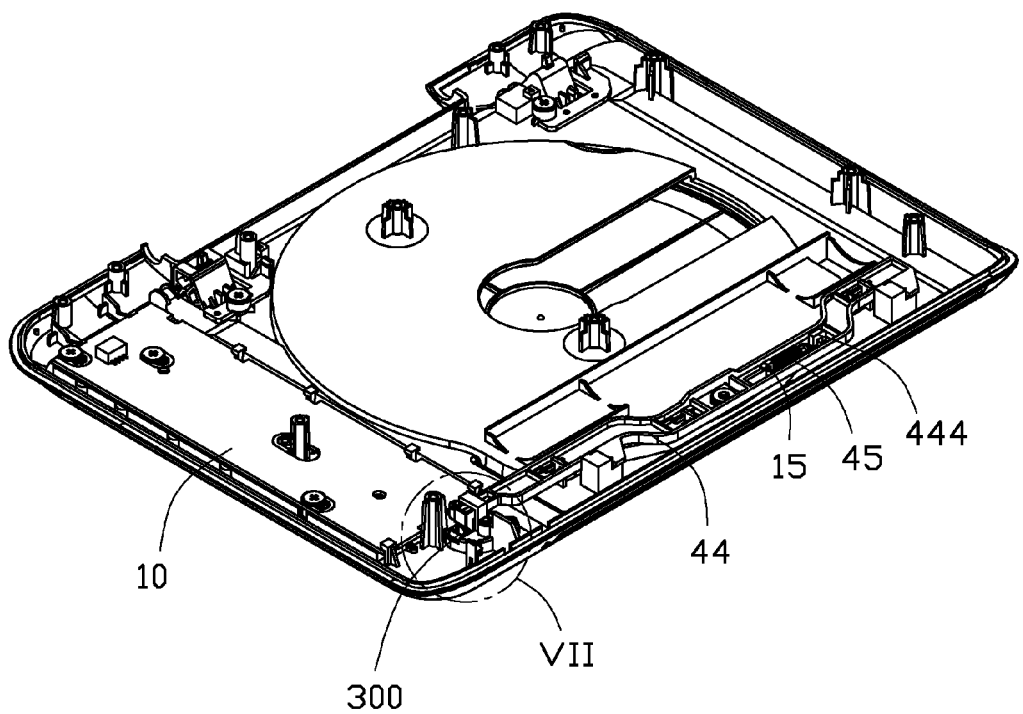
FIG. 6 is a partial, isometric view of the base of the electronic device of FIG. 1.
Figure 7:
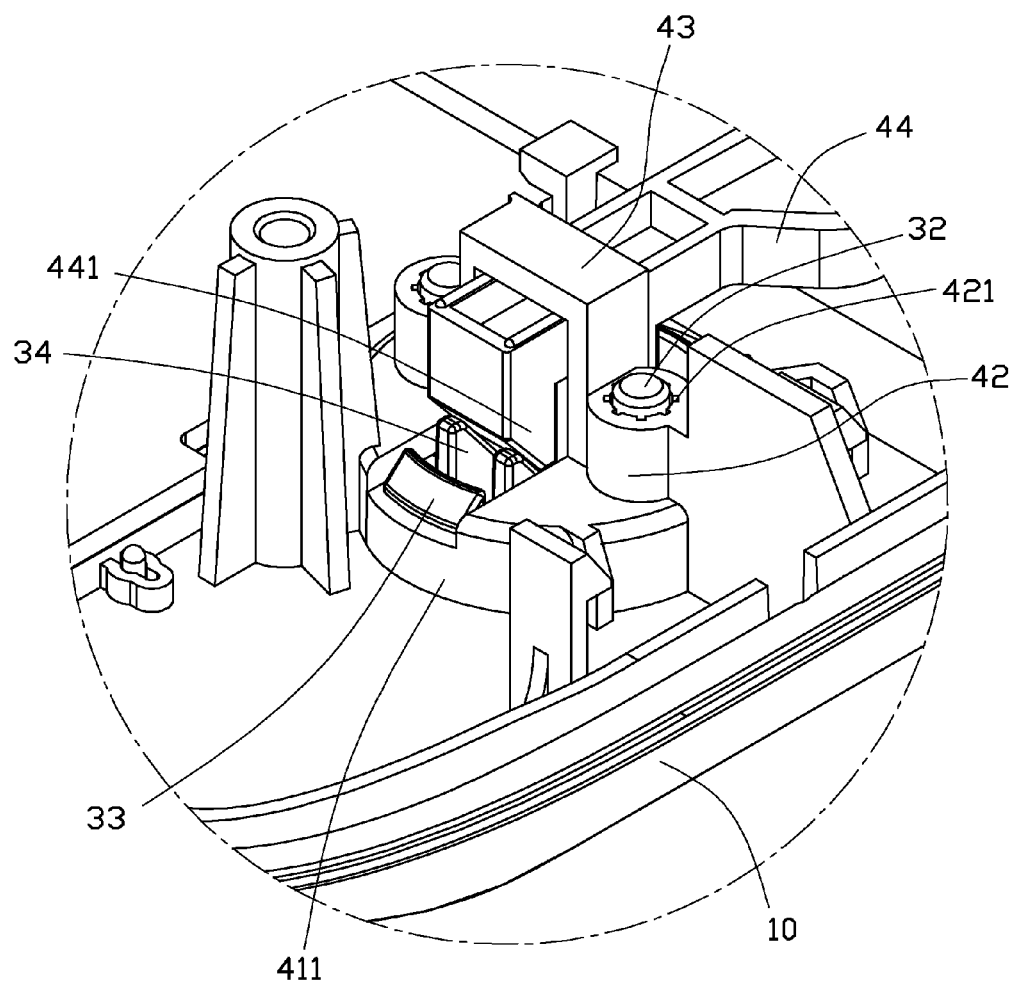
FIG. 7 is a partial, enlarged view of the circled portion VII of the base of FIG. 6.

The initial status of the electronic device 1 is shown in FIG. 2, in which the disc cover 20 is closed. Referring to FIGS. 6 and 7, the first hooks 33 clasp on the sidewall 411 of the button 30. The guiding posts 32 are received in the sleeves 42. The resisting elements 34 resist against the resisting member 441 of the sliding bar 44. The springs 23 are compressed, and the stopping elements 22 are clasped on the third hooks 442. When a user wants to open the disc cover 20, the press portion 31 of the button 30 is depressed, and the resisting elements 34, the guiding posts 32, and the first hooks 33 move downwardly into the body 10. The pressure on the resisting elements 34 is passed onto the resisting member 441 of the sliding bar 44, thus pushing the sliding bar 44 away from the button 30. At the same time, the elastic element 45 is stretched, and the guiding posts 32 slide along the sleeve 42 until the stopping elements 22 of the disc cover 20 disengages from the third hooks 442 of the sliding bar 44. Then the springs 23 rebound and the elastic restoring force leads the disc cover 20 to rotate counterclockwise to uncover the body 10. When the external force applied on the press portion 31 has ceased, the elastic element 45 rebounds and the elastic restoring force causes the sliding bar 44 to slide toward the button 30. The resisting member 441 pushes the resisting elements 34 of the button 30, thus guiding the button 30 to move upwardly, until the first hooks 33 clasp on the sidewall 411 of the button groove 41. The button 30 thus returns to the initial status.

With such a configuration, the oil grooves 421 of the pivot hole 420 contain lubricating oil for reducing friction between the inner walls of the pivot holes 420 and the guiding posts 32, which avoids scraping and wear created by the friction, thus effectively improving the stability of the button 30.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
   a body;
   a disc cover rotatably connected to the body;
   a button comprising a press portion, at least one guiding post, at least one first hook and a plurality of resisting elements, the at least one guiding post, the at least one first hook, and the plurality of resisting elements protruding from a bottom surface of the press portion; and
   a button securing structure fixed to the body and defining a button groove for receiving the press portion, the button groove comprising a sidewall for being detachably clasped by the first hooks, the button securing structure comprising:
   at least one sleeve protruding from a bottom surface of the button groove, each sleeve defining a pivot hole for slidably receiving one of the at least one guiding post, the inner wall of the pivot hole defining at least one groove for containing lubricant;
   a sliding bar slidably coupled to the body and detachably clasping the disc cover, one end of the sliding bar resisting against the plurality of resisting elements; and
   an elastic member comprising one end clasped by a clasping member protruding from the sliding bar, and an opposite end being clasped by a second hook protruding from the body;
   wherein when the press portion is depressed by an external force, the at least one first hook disengages from the sidewall of the button groove, the at least one guiding post slides along the pivot hole, the plurality of resisting elements pushes the sliding bar to slide to disengage from the body, and when the external force has ceased, the sliding bar is pushed by a restoring force of the elastic element and pushes the plurality of resisting elements and the button to slide, until the at least one first hook clasps the sidewall of the button groove.

2. The electronic device as described in claim 1, wherein the button securing structure further comprises a support protruding from the bottom surface of the button groove, the end of the sliding bar resisting against the plurality of resisting elements is supported by the support.

3. The electronic device as described in claim 2, wherein the support is U-shaped.

4. The electronic device as described in claim 1, wherein the at least one groove is strip-shaped and extends along an axial direction of the pivot hole.

5. The electronic device as described in claim 1, wherein the press portion and the button groove are circular.

6. The electronic device as described in claim 1, further comprising two springs mounted between the cover and the body for applying a rebounding force to the cover.

7. The electronic device as described in claim 6, wherein the two springs are torsion springs.

8. The electronic device as described in claim 6, wherein two pivot seats protrude from an inner surface of the disc cover for rotatably connecting the disc cover to the body.

9. The electronic device as described in claim 8, wherein two stopping elements protrude from an inner surface of the disc cover, a bottom surface of the chamber defines two first through holes for extension of the two stopping elements therethrough, two second through holes for extension of the two pivot seats therethrough, and two receiving openings for receiving the two springs respectively.

10. The electronic device as described in claim 1, wherein the elastic element is a coil spring.

\* \* \* \* \*